April 6, 1943.    J. M. KING    2,316,075
FLUID TEMPERATURE CONTROLLER
Filed July 18, 1939    2 Sheets-Sheet 1
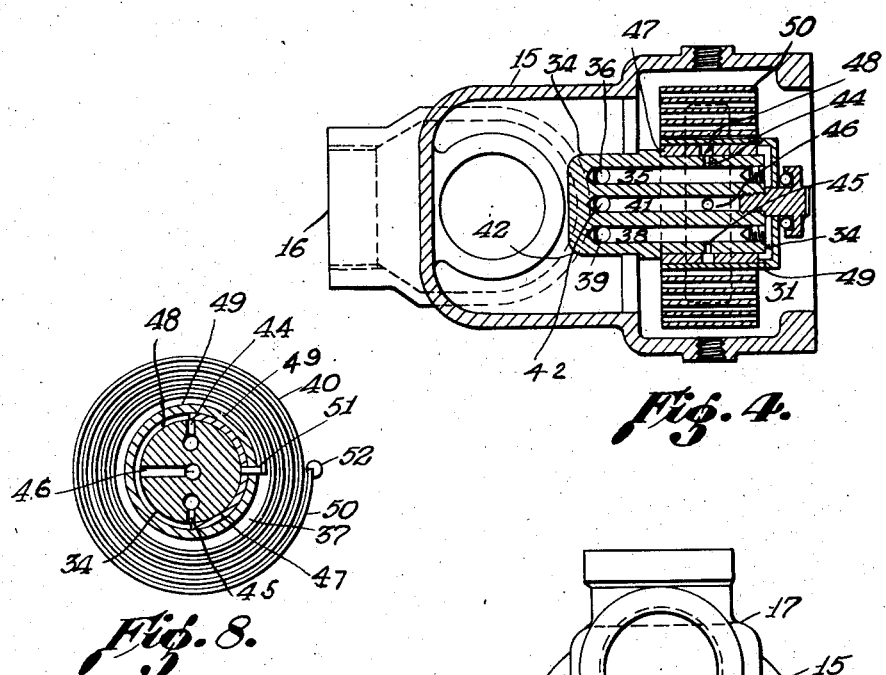
Fig. 4.
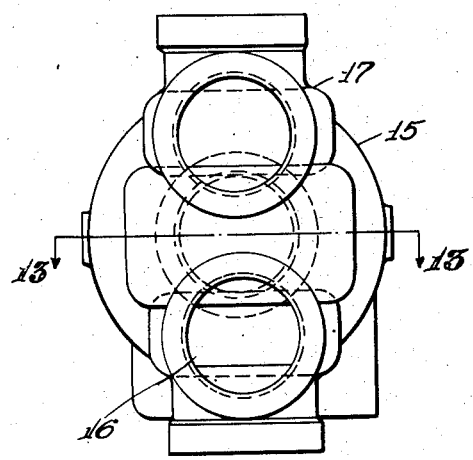
Fig. 1.
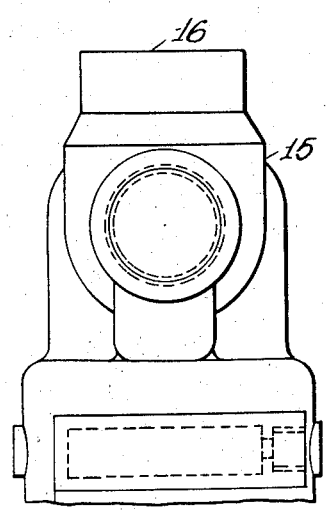
Fig. 8.
Fig. 6.
Inventor:
Joseph Manon King April 6, 1943.　　　　J. M. KING　　　　2,316,075
FLUID TEMPERATURE CONTROLLER
Filed July 18, 1939　　　2 Sheets-Sheet 2
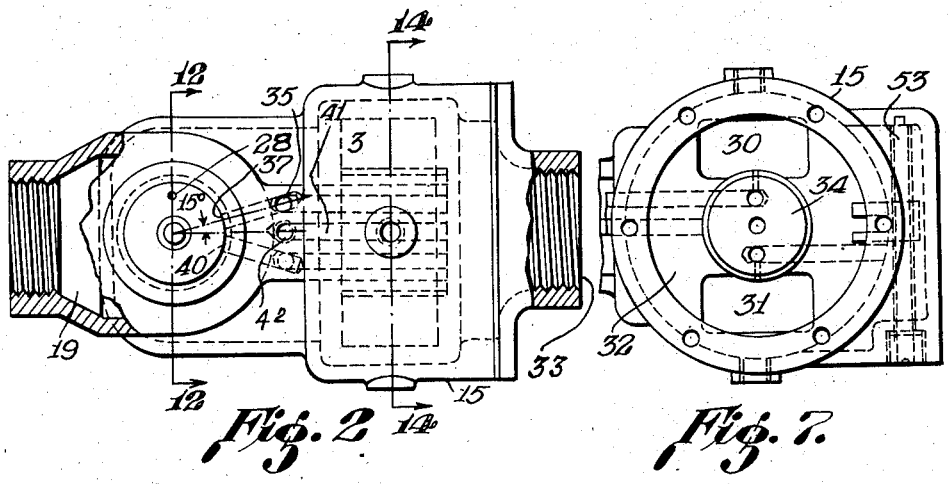
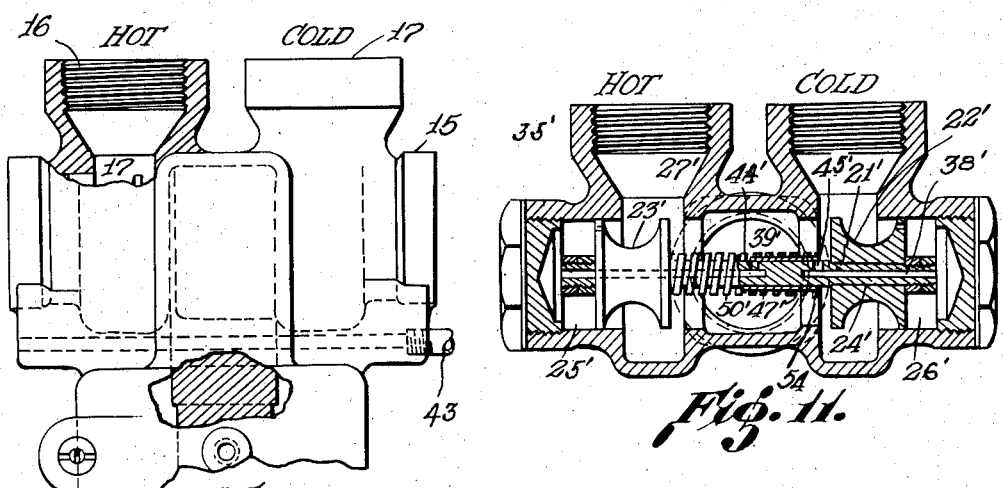
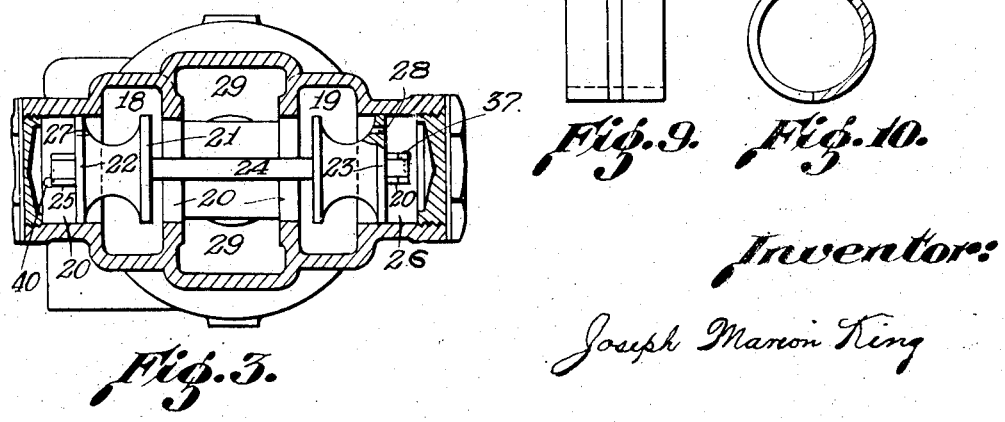
Inventor:
Joseph Marion King Patented Apr. 6, 1943

2,316,075

UNITED STATES PATENT OFFICE 2,316,075

FLUID TEMPERATURE CONTROLLER

Joseph Marion King, Detroit, Mich.

Application July 18, 1939, Serial No. 285,100

3 Claims. (Cl. 236—12)

This invention relates to temperature control devices, especially where it is desirable to establish and maintain an elective temperature of flowing water derived from hot and cold water sources. It is well known, in the art to which the invention appertains, that only approximately has this accomplishment been achieved, by controllers whose proportioning valve is directly connected to the thermostatic element and dependent upon that element for its movement. A drop in temperature of the source of supply affects the heat element, which correspondingly changes the position of the proportioning member with reference to that of the set-member, to which the other end of a thermostatic element is attached. Obviously such change introduces a new—a lower temperature. The reverse of this condition is in evidence when there is a rise in temperature of the source of supply. It is therefore true, that a given temperature can be maintained only so long as the temperature of the supply source remains constant.

One of the objects achieved in this invention is the discovery and exploitation of a new method of the use of a thermostatic element which obviates the difficulty recited and makes possible the maintenance of a predetermined temperature notwithstanding the fluxuation in temperature of the source of supply. The proportioning valve, by the new method, is not attached to the thermostatic element, the element being left free to move in response to temperature-change.

Another object attained is the construction and arrangement of a proportioning member that is not affected by the inflow or outflow pressures of the fluid, but solely by fluid pressures obtaining in hot and cold fluid pressure chambers.

A further object achieved is the devising of a member adapted to regulate and control the pressures in the said pressure-chambers in response to a change in temperature applicable to a thermostatic element.

A further object, is the construction of a temperature controller that will accommodate the use of silty and other mineral waters without the usual clogging up of parts and impairment of its efficiency, an instrument of simple structure, of few parts, and one economically produced.

The invention comprehends a fluid receptacle having inlets for hot and cold water and an outlet for the tempered fluid; a fluid proportioning member adapted to be actuated by fluid pressure and a thermostatic member adapted to control the said fluid pressure in response to temperature-change.

The invention contemplates the functioning of a thermostatic element, unincumbered by abnormal stress, such as is inevitable when required to move an object, such as a proportioning member, or when caused to leave its normal and assume a new position in response to a drop in temperature of the supply source. It further contemplates the use of the initial pressure of the fluid to actuate a proportioning member, and the free and independent action of a thermostatic element to register an elective temperature and in so doing to control the pressures that move the proportioning member.

The invention consists in the construction of parts, their organization and assembly as hereinafter more particularly described, detailed, pointed out in the appended claims and illustrated in the accompanying drawings. Throughout the drawings like numerals designate like parts.

Fig. 1 is a plan view of a fluid temperature controller embodying the invention.

Fig. 2 is an end view showing a broken section through the central portion of a cold water intake pipe connection.

Fig. 3 is a section on the line 12—12 of Figure 2 illustrating a fluid proportioning-member slidably mounted in hot and cold water pressure-chambers respectively, the openings in its member-heads for the passage of fluid to the said pressure-chambers, and the fluid passage ways to a receiving chamber.

Fig. 4 is a section on the line 13—13 of Figure 1 showing a cylindrical member in a discharge-chamber and mounted thereon a thermostatically equipped sleeve-member.

Fig. 5 is a side elevation disclosing a broken section through the central portion of a hot water intake pipe connection.

Fig. 6 is an end elevation illustrating the proper installation position of the controller.

Fig. 7 is a bottom view showing in dotted lines a set-member adapted to engage a thermostatic element and to be manually adjusted by means of a screwdriver.

Fig. 8 is a sectional view on the lines 14—14 of Figure 2 illustrating the cylindrical member and its fluid-passages, the sleeve-member and its centrally formed slot, the thermostatic element being mounted thereon.

Fig. 9 is a view of another form of a sleeve-member, adapted to discharge its leakage in the discharge chamber instead of to atmospheric pressure.

Fig. 10 is a circumferential section, centrally taken, of the sleeve-member Figure 9.

Fig. 11 illustrates another form of the fluid temperature controller disclosing the fluid proportioning-member, fluid passages, pressure chambers, thermostatic member, and sleeve-member.

The numeral 15 designates the body of a fluid temperature controlled provided with a hot water inlet 16 and a cold water inlet 17; leading therefrom is formed passage chambers 18 and 19 respectively. An annular opening 20 is longitudinally formed in the controller which concentrically intercepts, at right angles, the said passage chambers, eighteen and nineteen. In the said annular opening is movably mounted a balanced proportioning-member 21, which comprises two cylindrical member-heads 22 and 23, the said member-heads being held in fixed relation to each other by means of a rod 24 centrally positioned therein. The outer ends of the said member-heads being adapted to valvularly fit and move in the said annular opening and to form therewith a hot water pressure chamber 25 and a cold water pressure chamber 26; openings 27 and 28 are drilled in the outer ends of the said member-heads to provide inlets to the respective pressure-chambers for the introduction thereto of fluid under initial pressure.

Fluid flowing via the said member-heads enters a receiving chamber 29 and thence via openings 30 and 31 to a discharge chamber 32 and the outlet 33 formed in a bottom enclosing member.

Integrally cast with the controlled body fifteen and longitudinally concentric therewith is a cylindrical member 34. A longitudinal opening 35 is drilled in the said cylindrical member and made connective with a passage 36 formed at right-angles thereto, the said passage being made connective with the cold water pressure-chamber twenty-six by an opening 37 leading thereto. A longitudinal opening 38 is likewise formed in the said cylindrical member and likewise made connective with a similar passage 39 which is similarly made connective with the hot water chamber twenty-five by a similar opening 40 leading thereto. A third similar opening 41 is likewise formed in the said cylindrical member and likewise made connective with a similar passage 42 leading to atmospheric pressure. The end 43 of the said passage is provided with screw threads for pipe engagement.

Two relatively small holes, 180° apart are laterally drilled in the central portion of the said cylindrical member, the one 44 being made connective with the longitudinal opening thirty-five and the other relatively small hole 45 being made connective with the longitudinal opening thirty-eight. An opening 46 is laterally drilled in the central portion of the said cylindrical member and made connective with the longitudinal opening forty-one which provides a leakage discharge to atmospheric pressure.

A leak-proof sleeve-member 47 is formed having a slot 48 machined in the central portion of its circumferential side, the said slot reaching nearly to a central plane passing endwise through its length. A leak-proof shield 49 incloses the outer circumference of the said sleeve-member, which is mounted on the said cylindrical member and adapted to rotate thereon by means of a bimetal thermostatic coil 50 when subjected to temperature-change, the said coil being mounted on the said sleeve-member, its inner coil being fixedly connected thereto by a pin 51 and its outer coil 52 slidably connected to a set-member 53 which is adapted to be manually operated. The coil illustrated in Figures 4 and 8 is composed of thermostatic bimetal viz., a strip of nickel and a strip of brass welded together, which when subjected to temperature-change expands or contracts thus coiling or uncoiling itself. The sleeve-member-thermostatic-element is adapted to move on ball bearings as illustrated.

The Figure 9 illustrates a form of sleeve-member adapted for use in small temperature controllers, where the flow therefrom is comparatively large. The leakage is discharged into the discharge-chamber instead of to atmospheric pressure. In this type sufficient pressure is found to obtain in the chambers to properly actuate the proportioning member.

Figure 11 illustrates the fluid proportioning-member 21' with fluid-conveying passages formed in the connecting rod 24' communicable with the said hot and cold pressure-chambers, viz. the hot water passage 35' leading from the said chamber 25' to an outlet 44', and the cold water passage 38' leading from the said chamber 26', to the outlet 45'; the outlets, 44' and 45' being adapted to discharge in the discharge-chamber 39'. A leak-proof slidable sleeve-member 47' is mounted on the said rod 24' and adapted to simultaneously partially cover the two outlets, 44' and 45'. An elongating thermostatic element 50' is mounted on the said rod 24', one end of which is fixedly positioned in the member-head 23' the other end being attached to the said slidable sleeve-member 47' by means of a pin 54; the arrangement being such that under the influence of heat the said thermostatic element will elongate and move the slidable sleeve member 47' with reference to the outlets 44' and 45'.

When the temperature of the water is in excess of that predetermined, the sleeve 47' will move tending to cover the outlet 44' and to uncover the outlet 45'. This action tends to gradually release the pressure in the cold water chamber and to maintain that in the hot water chamber; the proportioning-member correspondingly moves to conform to the temperature position of the thermostatic element. When the set-temperature is thus attained the sleeve-member 47 will resume its normal position, which comprehends a partial covering of the outlets 44' and 45'.

The member 50' is composed of bimetal, a strip of nickel and a strip of brass welded together and coiled edgewise on a spindle in a lathe; during the process of winding, the coil at the point of coiling is raised to a temperature of about 400 degrees F. This expedient prevents strain on the grain of the metals and the coil therefore, in normal use tends to elongate when subjected to temperature-change.

The manner of operation, when the controller is installed for use is as follows:

The hot and cold water valves are opened, and instantly the thermostatic element is affected and begins to move. Its inner coil being fixedly attached to the sleeve-member causes such member to move in unisonance with the coil. A movement of but a few thousandths of an inch of the sleeve-member will drain the water out of one of the pressure-chambers while the other pressure-chamber will retain and maintain the initial pressure of the fluid. The proportioning-member therefore moves in response to the control-position of the sleeve-member and the sleeve-member moves in response to temperature-change. When the predetermined degree of temperature, fixed by the set-member, is attained, the sleeve-member will be so positioned on the cylindrical member as to admit an equal amount of leakage from each pressure-chamber. The least diminution or increase of temperature in the supply source will affect the thermostatic element and likewise the sleeve-member.

When an excess of temperature occurs in the discharge-chamber the thermostatic element rotates and thereby tends to limit the leakage from the hot water pressure-chamber and increase that from the cold water pressure-chamber; such condition tends to move the proportioning-member in a direction that increases the flow of cold water and diminishes that of the hot water.

What I claim as new is:

1. In a fluid temperature controller having primary inlets for respectively hot and cold fluids, an outlet for tempered fluid and a proportioning device to meter and control the flow of hot and cold fluids to a mixing chamber, a proportioning device symmetrical in structure comprising a rod, having formed on each end thereof a cylindrical valvular spool-like member, the said spool-like members mounted respectively in hot and cold fluid valve-fitting pressure-chambers and adapted to move therein in response to fluid pressure applicable to the extreme ends of the said spool-like members, and by such movement meter and control the flow of hot and cold fluids to a mixing chamber, and contiguous to each pressure chamber a portion of the primary fluid intake passage in which a portion of the said spool-like member is adapted to move, is enlarged to prevent valvular friction, and each of the said pressure-chambers provided with a diminutive inlet opening formed in the extreme end of each spool-like member adapted to communicate with initial-pressure fluid, and a larger outlet opening formed in the side of each pressure chamber constituting a fluid escape-port and made communicable, each with respectively hot and cold fluid passageways formed in a cylindrical member and made connective with the surface thereof by oppositely positioned openings, and a third passageway formed in the said cylindrical member and likewise made connective with its surface, the said third passageway being communicable with an outlet opening exposed on the exterior surface of the said controller, and a sleeve-valve member having formed on its inside surface a semicircular groove rotatably mounted on the said cylindrical member, the said groove corresponding to the line of location of three openings formed in the surface of the said cylindrical member whose surface being adapted to constitute a seat for the inside surface of the said sleeve-member, the surface-ends of the groove of the said sleeve-valve member adapted to close the oppositely positioned openings communicable with the said escape-ports, the groove designed to register continuously with the third opening which communicates with the third passageway, and the said sleeve-valve member adapted to be actuated by a thermostatic element in response to a temperature-change and thereby control the pressures in the said pressure-chambers.

2. In a fluid temperature controller having primary inlets for respectively hot and cold fluids, an outlet for tempered fluid and a proportioning device to meter and control the flow of hot and cold fluids to a mixing chamber, a proportioning device comprising a rod having formed on each end thereof a cylindrical spool-like member, the said spool-like member mounted respectively in hot and cold fluid cylindrically formed pressure-chambers and adapted to move as valves therein in response to fluid pressure applicable to the extreme ends of the said spool-like members and by such movement meter and control the flow of hot and cold fluids to a mixing chamber, and contiguous to each pressure chamber a portion of the primary fluid intake passage in which a portion of the said spool-like member is adapted to move, is enlarged to prevent valvular friction, and each of the said pressure chambers provided with a diminutive inlet opening in the extreme end of each spool-like member adapted to communicate with an initial-pressure fluid, and a larger outlet opening formed in the side of each pressure-chamber constituting a fluid escape-port made communicable each with respectively hot and cold fluid passageways formed in a cylindrical member and made connective with the surface thereof by oppositely positioned openings, and a third passageway formed in the said cylindrical member and likewise made connective with its surface, the said third passageway being communicable with an outlet opening exposed on the exterior surface of the said controller, and a sleeve-valve member having formed on its inside surface a semicircular groove is rotatably mounted on the said cylindrical member, the said groove corresponding to the line of location of the three openings formed in the surface of the said cylindrical member, and the surface-ends of the groove of the said sleeve-valve member adapted to close the oppositely positioned openings communicable with the said escape-ports, the groove designed to register continuously with the third opening which communicates with the third passageway, and the said sleeve-valve member adapted to valvularly register with the surface of the said cylindrical member and to be actuated by a thermostatic element in response to a temperature-change and thereby control the pressures in the said pressure-chambers, and means to adjust the said thermostatic element to effect an elective degree of temperature.

3. In a fluid temperature controller of the type described, a cylindrical member having formed therein two fluid passageways made connective with the surface thereof by oppositely positioned radial openings, one such passageway made communicable with an escape-port of a hot fluid-pressure-chamber and the other said passageway made communicable with an escape-port of a cold fluid-pressure-chamber, and a third fluid passageway formed in the said cylindrical member and likewise made connective with its surface by an opening and also made communicable with an outlet opening exposed on the exterior surface of the said controller, and a sleeve-valve member having formed on its inside surface a semicircular groove, the said sleeve-valve member rotatably mounted on the said cylindrical member and adapted to close the said oppositely positioned openings the said groove being designed to alternately communicate with one of the said oppositely positioned openings and to continuously communicate with the opening connective with the third passageway, and a thermostatic element adapted to rotate the said sleeve-valve member in response to temperature-change and thereby control the said fluid passageways leading from the said escape-ports.

JOSEPH MARION KING.